United States Patent [19]

Fujitani et al.

[11] 4,316,822

[45] Feb. 23, 1982

[54] CATALYST FOR PURIFYING EXHAUST GASES

[75] Inventors: Yoshiyasu Fujitani; Hideaki Muraki, both of Nagoya; Shiroh Kondoh, Aichi; Makoto Tomita, Obu; Kouji Yokota, Nagoya; Hideo Sobukawa, Nagoya; Tamotsu Nakamura, Nagoya, all of Japan

[73] Assignee: Kabushiki Kaisha Toyota Chuo Kenkyusho, Aichi, Japan

[21] Appl. No.: 214,279

[22] Filed: Dec. 8, 1980

[30] Foreign Application Priority Data

Dec. 19, 1979 [JP] Japan ................................ 54/166065

[51] Int. Cl.$^3$ ........................ B01J 21/06; B01J 23/10; B01J 23/42; B01J 23/44
[52] U.S. Cl. .................................. 252/462; 423/213.5
[58] Field of Search ..................... 252/462; 423/213.5

[56] References Cited

U.S. PATENT DOCUMENTS 3,914,390 10/1975 Kudo et al. ................... 252/462 X
3,945,948 3/1976 Westwood et al. ................ 252/472
4,153,579 5/1979 Summers et al. .................. 252/462

*Primary Examiner*—W. J. Shine
*Attorney, Agent, or Firm*—Oblon, Fisher, Spivak, McClelland & Maier

[57] ABSTRACT

A catalyst for reducing nitrogen oxides, carbon monoxide and hydrocarbons, the noxious components in exhaust gases from internal combustion engines, etc., comprising: a porous carrier of ceramic selected from the group consisting of alumina and alumina-magnesia spinel; and a catalyst ingredient supported thereon consisting essentially of zirconium oxide, cerium oxide and a metal selected from the group consisting of platinum, palladium and mixtures thereof.

16 Claims, No Drawings

CATALYST FOR PURIFYING EXHAUST GASES

BACKGROUND OF THE INVENTION

1. Field of the Invention

This invention relates to a catalyst for purifying exhaust gases which can reduce with high efficiency nitrogen oxides, carbon monoxide and hydrocarbons, the noxious components of exhaust gases from internal combustion engines, etc.

2. Description of the Prior Art

Various catalysts have been suggested to date for reducing the noxious components of such exhaust gases as mentioned above. Catalysts containing platinum, palladium or rhodium as a catalyst ingredient supported on an alumina carrier are considered to have a relatively superior purifying activity.

However, catalysts containing a single metal of platinum or palladium as a catalyst ingredient, i.e., a platinum (Pt) catalyst and a palladium (Pd) catalyst, have a poor purifying activity, especially in reducing nitrogen oxides ($NO_x$). Therefore, catalysts containing a mixed metal of platinum or palladium with rhodium as a catalyst ingredient, i.e., a platinum-rhodium (Pt-Rh) catalyst and a palladium-rhodium (Pd-Rh) catalyst have been put to practical use. Nevertheless, the amount of rhodium present on the earth is said to be from one tenth to one fifth of the amount of platinum. Therefore, the use of rhodium should be reduced to as small an amount as possible.

Thus, the various conventional catalysts which have been suggested to date are still unable to meet the requirements for the purification of motor vehicle exhaust gases because they cannot reduce the aforesaid three noxious components with a high efficiency, and they cannot be obtained at an economically low cost.

A need therefor continues to exist for a catalyst for the reduction of nitrogen oxides, carbon monoxide and hydrocarbons in the exhaust gases from internal combustion engines, which exhibits high efficiency for said reduction and which can be obtained at an economically low cost.

SUMMARY OF THE INVENTION

Accordingly, one object of the invention is to provide a catalyst for efficiently and effectively reducing nitrogen oxides, carbon monoxide and hydrocarbons which are the noxious components in exhaust gases from internal combustion engines, etc.

Another object is to provide a catalyst having an especially superior effect in the simultaneous reduction of the noxious components in gases exhausted from an internal combustion engine operated at an air-fuel ratio of from 13.5 to 15.5.

A further object of the present invention is to provide a catalyst which can be obtained at an economically low cost.

Briefly these objects and other objects of the invention as hereinafter will become more readily apparent can be attained by providing a catalyst for purifying exhaust gases, said catalyst comprising zirconium oxide ($ZrO_2$), cerium oxide ($CeO_2$) and a metal of platinum (Pt), palladium (Pd) or mixtures thereof supported on a carrier, said carrier being a porous body of ceramic selected from the group consisting of alumina and alumina-magnesia spinel.

DETAILED DESCRIPTION OF THE PREFERRED EMBODIMENTS

According to this invention, a catalyst can be obtained which can reduce the aforesaid noxious components, i.e., nitrogen oxides ($NO_x$), carbon monoxide (CO) and hydrocarbons (HC), in a high efficiency. The catalyst exhibits an especially superior effect for the simultaneous reduction of the aforesaid noxious components in gases exhausted from an internal combustion engine which is operated at an air-fuel ratio (the weight ratio of air to gasoline fed into the internal combustion engine) of from 13.5 to 15.5.

Since zirconium oxide, cerium oxide and a metal of platinum, palladium or the mixtures thereof are used as a catalyst ingredient, the catalyst of this invention can be obtained at a low cost as compared with the aforesaid catalyst using rhodium as a catalyst ingredient such as a platinum-rhodium catalyst and a palladium-rhodium catalyst.

In the present invention, alumina such as α-alumina and δ-alumina, and alumina-magnesia spinel are used as a porous body of ceramic for a catalyst carrier. Especially, in the case where alumina-magnesia spinel is used as a porous body of ceramic for a carrier, the catalyst has high mechanical strength and superior durability at high temperatures. Namely, alumina-magnesia spinel has high mechanical strength at high temperatures, and even when it is used at high temperatures, the crystal structure does not change as in the case of general alumina carriers and the losses in surface area and the reduction in mechanical strength which accompany the above change are obviated. Moreover, the catalyst exhibits a good duration of catalytic activity at high temperatures.

Preferably, the porous body as a carrier has an average pore diameter of 0.01 to 2 microns. If its average pore diameter falls outside the above-specified range, it is difficult for the catalyst to exhibit a superior activity in the purification of exhaust gases.

Next, supporting of the catalyst ingredients, i.e., zirconium oxide, cerium oxide and a metal of platinum, palladium or both, on the aforesaid porous body will be described hereinafter.

In supporting zirconium oxide and cerium oxide on the carrier, the amount of zirconium oxide is preferably 0.6 g to 100 g per liter of the carrier, and the amount of cerium oxide is preferably 0.8 g to 170 g per liter thereof. If the respective amounts of zirconium oxide and cerium oxide are less than the above-mentioned range, the purifying activity of the catalyst is low, and if their amounts are more than the above-mentioned range, no corresponding increase in activity can be observed.

A liter of the carrier in the form of pellets corresponds to the weight of about 700 g to 900 g, and a liter thereof in the form of honeycombs corresponds to the weight of about 600 g to 800 g.

The total amount of a metal of platinum, palladium or both supported on the carrier is preferably 0.01 g to 50 g per liter of the carrier. If the amount is less than 0.01 g/l, purifying activity of the catalyst is low, and if its amount is more than 50 g/l, no corresponding increase in activity can be observed.

Supporting of the aforesaid catalyst ingredients on the carrier is effected, as described in the Examples, by dipping the porous body for impregnation in a solution of raw materials forming each of the catalyst ingredients such as zirconium oxynitrate [$ZrO(NO_3)_2.2H_2O$], zirconium oxychloride [$ZrOCl_2.2H_2O$], cerium (III) nitrate [$Ce(NO_3)_3.6H_2O$], cerium (III) chloride [$CeCl_3.7H_2O$], palladium nitrate [$Pd(NO_3)_2$], palladium chloride [$PdCl_2$], platinum nitrate [$Pt(NO_3)_4$], chloroplatinic acid [$H_2PtCl_2.6H_2O$], drying and calcining the impregnated porous body. By the calcination, each of the aforesaid raw materials is converted into the respective catalyst ingredients of zirconium oxide ($ZrO_2$), cerium oxide ($CeO_2$), platinum (Pt) and palladium (Pd), and supported on the porous body for a catalyst carrier.

As the catalyst carriers of ceramics in accordance with the present invention, a porous body of alumina is produced by sintering alumina powders. A porous body of alumina-magnesia spinel is produced by mixing alumina powders and magnesia powders, and sintering the mixed materials with heating at more than 1,000° C. to form a spinel consisting of alumina and magnesia. The carriers obtained above are superior in durability of catalytic activity.

The aforesaid carrier may be molded into any desired shape such as pellets, pillars and honeycombs.

In the present invention, to save the alumina powder or mixed powder of alumina powder and magnesia powder, it is possible to coat the aforesaid powder on a mother matrix such as a pellet and a honeycomb structure of cordierite, etc., produced separately from the present invention, and to sinter the coated product to form a porous body for a catalyst carrier. Then, the catalyst ingredients are supported on the porous body to prepare the catalyst of this invention, as described in Example 3.

Having generally described this invention, a further understanding can be obtained by reference to certain specific examples which are provided herein for purposes of illustration only and are not intended to be limiting unless otherwise specified.

EXAMPLE 1

The catalyst ingredients of this invention were supported on the sintered bodies of alumina-magnesia spinel as a porous carrier to prepare the catalysts. Then, the purifying activities of these catalysts were evaluated.

1,500 g of a γ-alumina powder having an average particle diameter of 0.5 micron and 527 g of a magnesia powder having an average particle diameter of 1 micron were mixed, and a small amount of water was added. They were thoroughly mixed. The mixture was molded into spherical pellets having a diameter of about 3 mm by "Marumerizer" (trade mark). The pellets were sintered by heating at 1,350° C. for 6 hours to form the spherical sintered bodies of alumina-magnesia spinel as a catalyst carrier.

Then, each of the resulting spherical sintered bodies was dipped in an aqueous solution of raw materials forming catalyst ingredients shown as below, dried and calcined in the air at 600° C. for 3 hours to prepare the various catalysts containing the catalyst ingredients in accordance with the present invention supported on the carriers, as shown in Table 1.

The spherical sintered body as a carrier consisted of 91% by weight of $MgAl_2O_4$ and 9% by weight of $Al_2O_3$, but MgO was not present therein. A specific surface area thereof was 9 m²/g.

Aqueous solutions used for supporting the catalyst ingredients on the carriers were the respective aqueous solutions of zirconium oxynitrate for supporting zirconium oxide, of cerium (III) nitrate for supporting cerium oxide, of platinum nitrate for platinum, and of palladium nitrate for palladium.

In supporting the aforesaid catalyst ingredients on the carrier, after zirconium oxide was firstly supported, cerium oxide was supported in the same way and thereafter platinum, palladium or the mixtures thereof was supported on the carrier. Each of the aforesaid nitrates was converted by calcining into each of the catalyst ingredients to be supported on the carrier.

To evaluate the durability of these catalysts, each of the catalysts was kept at 800° C. for 100 hours in the atmosphere filled with an exhaust gas from an internal combustion engine of an automobile operated in such a way that the air-fuel ratio was changed periodically by 0.8 upward or downward of the theoretical air-fuel ratio (A/F=14.6) with a period of a second. The exhaust gas was fed into the catalyst layer at a space velocity of 25,000/hour.

Then, the purifying activities of the catalysts which were tested on their durability under the above-mentioned conditions were evaluated.

Each of the catalysts was filled in a quartz tube and kept at 400° C. An exhaust gas from an internal combustion engine of an automobile was fed into the tube at a space velocity of 30,000/hour. The exhaust gas was obtained by operating the internal combustion engine such that the air-fuel ratio was changed periodically by 0.8 upward or downward of the theoretical air-fuel ratio with a period of 2 seconds. Since the fluctuation of the air-fuel ratio was wide in its range and the period was long, the above-mentioned conditions as the evaluation of purifying activities were more rigid than the conventional ones.

The average concentrations of the noxious components in the exhaust gas in the above operation were approximately 0.1% for nitrogen oxides ($NO_X$), 0.62% for carbon monoxide (CO), 0.5% for hydrocarbons (HC), 12% for carbon dioxide ($CO_2$), 0.2% for hydrogen ($H_2$), 0.54% for oxygen ($O_2$), 13% for water ($H_2O$), and the remainder being nitrogen ($N_2$), all by volume.

The purifying activities were rated by the percent reduction of the above noxious components. The results are shown in Table 2.

For comparison, the spherical sintered bodies of alumina-magnesia spinel were used as a carrier, and the catalyst ingredients except zirconium oxide were supported on the carrier to prepare the catalysts (Nos. $S_1$–$S_3$) in the same way as above. These catalysts were evaluated in the same manner as above. The data for these comparative catalysts are also shown in Tables 1 and 2.

TABLE 1

| Catalyst No. | Amount of Catalyst Ingredient (g/l) | | | | |
|---|---|---|---|---|---|
| | $ZrO_2$ | $CeO_2$ | Pd | Pt | |
| 1 | 12.3 | 34.4 | 1.8 | — | |
| 2 | 24.6 | 34.4 | 1.8 | — | |
| 3 | 37.0 | 34.4 | 1.8 | — | |
| 4 | 61.6 | 34.4 | 1.8 | — | |
| 5 | 86.2 | 34.4 | 1.8 | — | Invention |
| 6 | 61.6 | 34.4 | — | 1.5 | |
| 7 | 61.6 | 34.4 | 1.6 | 0.3 | |
| 8 | 61.6 | 17.2 | 1.8 | — | |
| 9 | 61.6 | 51.6 | 1.8 | — | |
| 10 | 61.6 | 86.1 | 1.8 | — | |
| $S_1$ | — | 34.4 | 1.8 | — | |
| $S_2$ | — | 34.4 | 1.6 | 0.3 | Comparison |
| $S_3$ | — | 34.4 | — | 1.5 | |

TABLE 2

| Catalyst No. | Percent Reduction (%) | | | |
|---|---|---|---|---|
| | NO$_x$ | CO | HC | |
| 1 | 83.5 | 89.5 | 76.0 | |
| 2 | 88.0 | 92.5 | 80.7 | |
| 3 | 91.5 | 92.0 | 82.5 | |
| 4 | 92.0 | 93.0 | 83.0 | |
| 5 | 92.5 | 93.0 | 82.7 | Invention |
| 6 | 60.3 | 63.4 | 52.0 | |
| 7 | 90.9 | 92.5 | 80.5 | |
| 8 | 91.5 | 90.3 | 80.5 | |
| 9 | 93.2 | 94.4 | 83.7 | |
| 10 | 93.0 | 96.0 | 84.4 | |
| S$_1$ | 77.6 | 84.7 | 69.3 | |
| S$_2$ | 78.6 | 85.7 | 71.3 | Comparison |
| S$_3$ | 52.8 | 56.9 | 34.8 | |

It is evident from the above table that the catalysts in accordance with this invention has a much higher purifying activity than the comparative catalysts (Nos. S$_1$–S$_3$). The evaluation of purifying activity in this Example was carried out under rigid conditions of the air-fuel ratio as mentioned above. Under these conditions, the catalysts of this invention can exhibit a high purifying activity.

EXAMPLE 2

The catalysts of this invention were prepared by using the spherical porous bodies of α-alumina as a catalyst carrier. The durability of these catalysts was tested and then their purifying activities were evaluated in the same way as Example 1.

The carriers of α-alumina were obtained by sintering commercially available δ-alumina which had a diameter of 3 mm in an electric furnace at 1,200° C. for 3 hours. These carriers had a specific surface area of 20 m$^2$/g.

The catalysts prepared in Example 2 were shown in Table 3 and the results of evaluation for purifying activity were shown in Table 4. For comparison, the data for the catalysts not containing zirconium oxide as a catalyst ingredient (Nos. S$_4$, S$_5$ and S$_6$) were also shown in these Tables.

TABLE 3

| Catalyst No. | Amount of Catalyst Ingredient (g/l) | | | | |
|---|---|---|---|---|---|
| | ZrO$_2$ | CeO$_2$ | Pd | Pt | |
| 11 | 12.3 | 34.4 | 1.8 | — | |
| 12 | 36.9 | 34.4 | 1.8 | — | |
| 13 | 61.6 | 34.4 | 1.8 | — | |
| 14 | 61.6 | 34.4 | — | 1.5 | Invention |
| 15 | 61.6 | 34.4 | 1.6 | 0.3 | |
| 16 | 61.6 | 17.2 | 1.8 | — | |
| 17 | 61.6 | 86.1 | 1.8 | — | |
| S$_4$ | — | 34.4 | 1.8 | — | |
| S$_5$ | — | 34.4 | 1.6 | 0.3 | Comparison |
| S$_6$ | — | 34.4 | — | 1.5 | |

TABLE 4

| Catalyst No. | Percent Reduction (%) | | | |
|---|---|---|---|---|
| | NO$_x$ | CO | HC | |
| 11 | 84.6 | 87.2 | 73.0 | |
| 12 | 92.8 | 95.1 | 80.6 | |
| 13 | 93.2 | 95.3 | 82.9 | |
| 14 | 55.5 | 60.5 | 50.3 | Invention |
| 15 | 92.2 | 94.2 | 79.8 | |
| 16 | 89.5 | 92.3 | 72.2 | |
| 17 | 93.0 | 95.5 | 81.6 | |
| S$_4$ | 69.6 | 80.9 | 43.0 | |
| S$_5$ | 74.3 | 83.2 | 55.8 | Comparison |
| S$_6$ | 52.3 | 55.8 | 29.8 | |

It is evident from the above table that the catalysts obtained by using the carriers of α-alumina have a high purifying activity.

EXAMPLE 3

The carriers obtained by forming the porous layer of δ-alumina or α-alumina on the wall surface of the honeycomb structure of cordierite as a matrix were used. The catalyst ingredients in accordance with this invention were supported on the aforesaid carriers in the same way as Example 1 to prepare the catalysts. Then, the durability of these catalysts were tested, and thereafter the purifying activities were evaluated in the same manner as Example 1.

The honeycomb structure was made of cordierite, and had a cell thickness of 0.15 mm and a cell number of 300/in$^2$.

The formation of the porous layer of δ-alumina was carried out by impregnating the honeycomb structure with slurry which consisted of δ-alumina powder having an average pore diameter of 1μ and water, adhering the δ-alumina powder to the wall surface of the honeycomb structure, and heating the resulting product at 800° C. for 4 hours. The porous layer of δ-alumina powder had the thickness of about 0.1 mm and weighed 70 g relative to 700 g of the honeycomb structure of cordierite.

The formation of the porous layer of α-alumina powder was carried out by impregnating the honeycomb structure with slurry which consisted of α-alumina powder having an average pore diameter of 1μ and water, adhering the α-alumina powder to the wall surface of the honeycomb structure, and heating the resulting product at 900° C. for 6 hours. The porous layer of α-alumina powder had the thickness of about 0 mm and weighed 70 g relative to 700 g of the honeycomb structure of cordierite.

The catalysts prepared in Example 3 are shown in Table 5 and the activity for purifying exhaust gases are shown in Table 6.

TABLE 5

| Catalyst No. | Porous Layer | Amount of Catalyst Ingredient (g/l) | | | |
|---|---|---|---|---|---|
| | | ZrO$_2$ | CeO$_2$ | Pd | Pt |
| 18 | δ-Al$_2$O$_3$ | 24.6 | 51.6 | 3.0 | 0.5 |
| 19 | δ-Al$_2$O$_3$ | 36.9 | 51.6 | 3.0 | 0.5 |
| 20 | δ-Al$_2$O$_3$ | 61.6 | 51.6 | 3.0 | 0.5 |
| 21 | δ-Al$_2$O$_3$ | 36.9 | 51.6 | 3.0 | 0.5 |

TABLE 6

| Catalyst No. | Percent Reduction (%) | | |
|---|---|---|---|
| | NO$_x$ | CO | HC |
| 18 | 71.1 | 92.3 | 82.4 |
| 19 | 86.2 | 95.3 | 90.5 |
| 20 | 89.3 | 96.7 | 92.3 |
| 21 | 91.5 | 97.4 | 90.8 |

It is evident from the above table that the catalysts can exhibit a superior purifying activity in the case where the catalyst ingredients are supported on the porous layer of ceramics formed on the matrix of cordierite having small surface area.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A catalyst for reducing nitrogen oxides, carbon monoxide and hydrocarbons, the noxious components in exhaust gases comprising:
   a porous carrier of ceramic; and
   a catalyst ingredient supported thereon consisting essentially of zirconium oxide, cerium oxide and a metal selected from the group consisting of platinum, palladium and mixtures thereof.

2. The catalyst according to claim 1, wherein said ceramic is one selected from the group consisting of alumina and alumina-magnesia spinel.

3. The catalyst according to claim 2, wherein said alumina is one selected from the group consisting of α-alumina and δ-alumina.

4. The catalyst according to claim 1, wherein the amount of zirconium oxide supported on the carrier is from 0.6 g to 100 g per liter of the carrier.

5. The catalyst according to claim 1, wherein the amount of cerium oxide supported on the carrier is from 0.8 g to 170 g per liter of the carrier.

6. The catalyst according to claim 1, wherein the amount of said metal supported on the carrier is from 0.01 g to 50 g per liter of the carrier.

7. The catalyst according to claim 1, wherein said porous carrier has an average pore diameter of 0.01 to 2 microns.

8. The catalyst according to claim 1, wherein the shape of the catalyst is one selected from the group consisting of pellets, pillars and honeycombs.

9. The catalyst according to claim 1, wherein said porous carrier comprises a matrix of cordierite and a porous layer of ceramic formed on the surface thereof.

10. The catalyst according to claim 9, wherein the shape of said matrix is one selected from the group consisting of pellets and honeycombs.

11. The catalyst according to claim 9, wherein said ceramic is one selected from the group consisting of α-alumina, δ-alumina and alumina-magnesia spinel.

12. A method of producing the catalyst according to claim 1, which comprises:
    dipping a porous body in a solution of compounds of zirconium, cerium and a metal selected from the group consisting of platinum, palladium and mixtures thereof;
    drying the resulting porous body; and
    calcining it.

13. The method according to claim 12, wherein the zirconium compound is one selected from the group consisting of zirconium oxynitrate and zirconium oxychloride.

14. The method according to claim 12, wherein the cerium compound is one selected from the group consisting of cerium (III) nitrate and cerium (III) chloride.

15. The method according to claim 12, wherein the platinum compound is one selected from the group consisting of platinum nitrate and chloroplatinic acid.

16. The method according to claim 12, wherein the palladium compound is one selected from the group consisting of palladium nitrate and palladium chloride.

* * * * *